United States Patent [19]

Morton

[11] Patent Number: 4,752,270
[45] Date of Patent: Jun. 21, 1988

[54] GAME CALL WITH INTERCHANGEABLE REED

[76] Inventor: Michael H. Morton, Rte. 4, Box 935, El Dorado, Ark. 71730

[21] Appl. No.: 931,206

[22] Filed: Nov. 17, 1986

[51] Int. Cl.$^4$ .......................... A63H 5/00; G10D 9/02
[52] U.S. Cl. .................................... 446/207; 446/202; 84/383 B
[58] Field of Search ............... 446/202, 207, 208, 209; 116/22 A, 137 R; 84/375, 383 A, 383 B, 384; 43/1, 2, 3

[56] References Cited

U.S. PATENT DOCUMENTS

| | | | |
|---|---|---|---|
| 1,417,343 | 5/1922 | Michalicek | 446/202 |
| 1,468,519 | 9/1923 | Seabrook | 116/137 |
| 1,626,198 | 4/1927 | Jacquemin | 116/137 R |
| 2,700,316 | 1/1955 | Gordon et al. | 446/202 |
| 2,747,315 | 5/1956 | Clemas | 43/3 |
| 3,066,443 | 12/1962 | Mobley | 446/207 |
| 3,824,949 | 7/1974 | Aquila | 116/137 R |
| 4,138,800 | 2/1979 | Lege | 446/207 |
| 4,483,097 | 11/1984 | Piper | 446/207 |
| 4,517,875 | 5/1985 | Dossekker | 84/383 B |

Primary Examiner—Robert A. Hafer
Assistant Examiner—Charles H. Harris
Attorney, Agent, or Firm—Stephen D. Carver

[57] ABSTRACT

A vertically operable reed type game call for hunters which audibly generates a plurality of game attracting sounds. The game call comprises a rigid, generally tubular barrel shaped body having a lower cylindrical base integral with a mouthpiece segment which terminates in an upper angled surface penetrated by an air admission orifice in fluid flow communication with the hollow interior of the call. A pair of channels integrally disposed on opposite sides of the upper surface of the mouth piece are adapted to confine and slidably receive a reed which is adapted to be vibrated by inrushing air to produce sound. Preferably an annular, encircling groove is disposed between the lower base portion and the mouth piece for securing a tensioned, encircling necklace adapted to be worn by the user to readily facilitate convenient out-of-the way transportation of the call. The guide channels comprise a pair of parallel spaced-apart slots disposed upon opposite sides of the air admission orifice which terminate longitudinally in an integral travel limiting surfaces which prevent misadjustment of the flat vibration producing reed. Preferably the flat upper surface of the mouth piece forms an angle of approximately twenty two degrees relative to the horizontal to accommodate the hunter's lips, and the front of the mouthpiece incldues a concave user-facing surface adapted to accommodate the lips of the user.

4 Claims, 2 Drawing Sheets

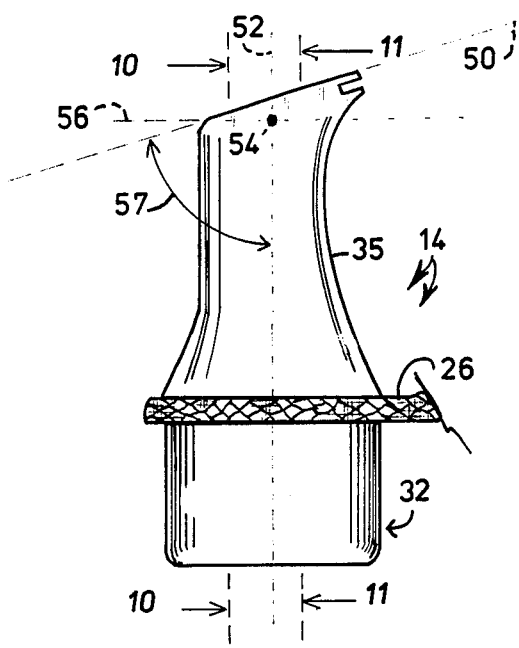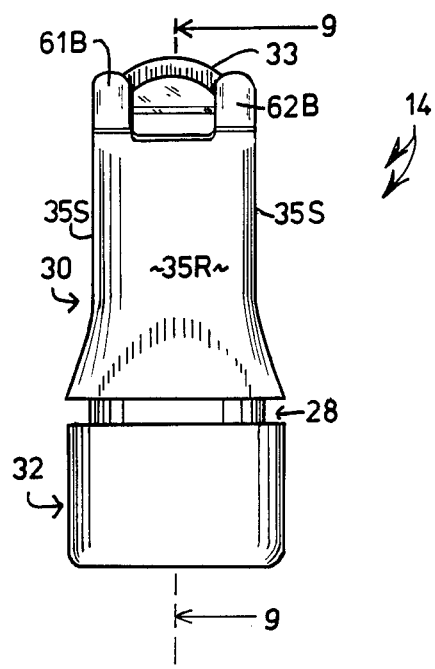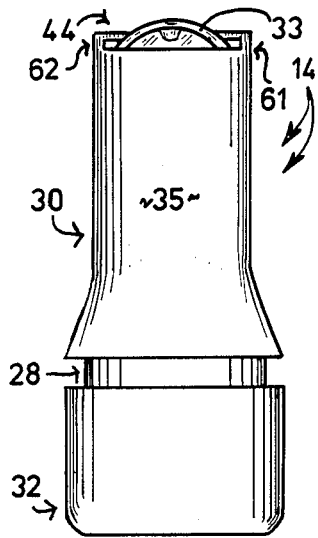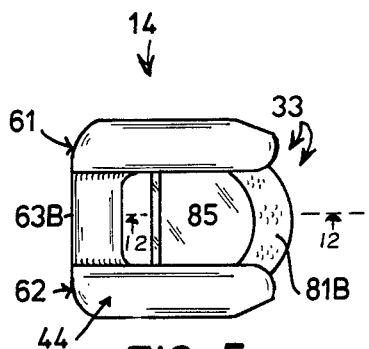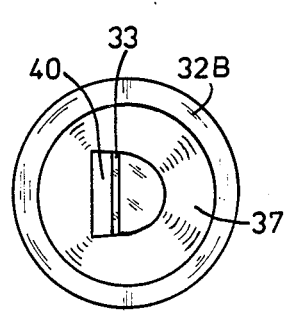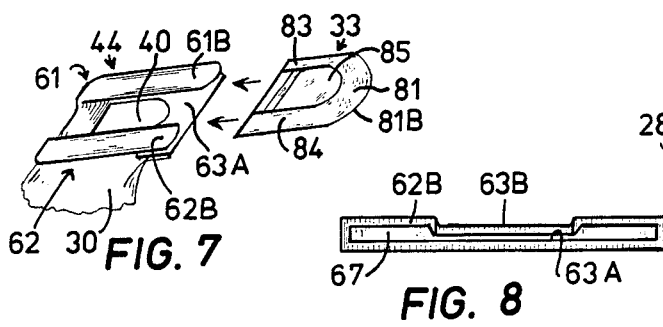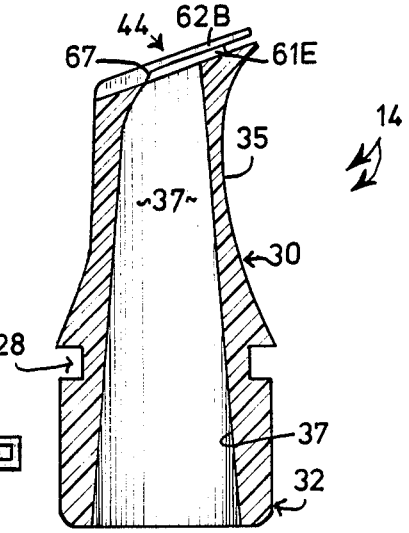

GAME CALL WITH INTERCHANGEABLE REED

BACKGROUND OF THE INVENTION

The present invention relates generally to game calling apparatus. More particularly, the present invention is directed to mouth-operated game calls of the type comprising a generally tubular body having a mouthpiece formed at one end, and a cooperating diaphragm or reed which audibly vibrates in response to the passage of air.

A plurality of prior game calls are broadly known in the game hunting arts. Calls exist for a variety of game birds such as ducks, geese, turkeys and the like. It is also known to employ game calls for purposes of game attraction during the hunting of larger animals such as elk or moose.

Two principal types of audible hunter game calls exist. "Reed operated" game calls produce sound in response to the passage of air over or through a vibrating diaphragm. Reed type calls may resemble miniature musical instruments, and they usually require their operator to appropriately position the lips of his mouth upon a mouthpiece. "Frictional" game calls require the rubbing together of certain parts to produce sound. Frictional game calls generally include some form of usually pointed structure adapted to be frictionally rubbed against a preferably chalked rubbing surface of an associated sounding board member. One or more forms of resonator chambers and resonator holes have been known in the prior art to add coloration and sound quality to the various forms of frictional game calls.

Most reed type game calls include a generally tubular body in which a mouthpiece is associated with a reed or the like. It is usually the case that such calls are substantially elongated, and adapted to be inserted into the mouth of the hunter in much the same manner as a musical instrument such as clarinet or the like. In other words, known reed type calls generally operationally extend horizontally outwardly from the mouth of the hunter in use.

A typical reed type game call is seen in Dieckmann U.S. Pat. No. 3,066,444 issued Dec. 4, 1962. A similar call is disclosed in Jones U.S. Pat. No. 2,729,025 issued Jan. 3, 1956. Both of the latter references include a generally horizontally extending tubular body in which an internally disposed reed is employed to generate sounds in response to blowing through the mouth piece thereof. This basic type of "horizontal" reed call is further illustrated by U.S. Pat. Nos. 3,991,513; 3,802,120; 4,048,750; 4,143,485; 2,612,723; and 3,066,443. A generally barrel shaped game call is seen in U.S. Pat. No. 3,928,935.

One problem with reed game calls of the type described above is that the reed apparatus is usually multi-segmented, and it is usually disposed virtually coaxially within the tubular system in an inaccessible position. In other words, it would be noted from an inspection of such patents as Mobley U.S. Pat. No. 3,066,443, for example, that the reed apparatus is centered coaxially within the body of the elongated hollow sounding member, and it is inconvenient for the user to change or adjust reeds. U.S. Pat. No. 3,208,184 issued Sept. 28, 1965 to E. L. Wisor discloses a frictional turkey call in which a striking rod associated with a cylindrical resonator chamber is adapted to be rubbed upon the surface of an associated resonator board. Jacobs in U.S. Pat. No. 4,310,986, issued Jan. 19, 1982 and Tannehill, U.S. Pat. No. 4,958,157 issued Nov. 1, 1960 disclose turkey callers of the same general structural type as Wisor. The frictional game call of U.S. Pat. No. 3,927,490, comprises an elongated, generally rectangular rubbing board adapted to be frictionally rubbed to generate an audible turkey call. The frictional game call of U.S. Pat. Nos. 3,367,064, 4,041,639 and 3,716,943 include a tubular resonator assembly comprising an outwardly projecting, cylindrical, striker rod adapted to be "scratched" across a frictional surface. Other forms of frictional "rubbing type" game calls are shown in U.S. Pat. Nos. 3,793,767, and 4,343,108. Both of the latter structures comprise frictional box type turkey calls wherein a "lever" arm is moved across a frictional surface to produce sound.

It is mandatory that a suitable game call be capable of properly emulating a wide variety of game attracting sounds. Most known prior art game calls are unable to accurately reproduce the wide variety of sounds which are required. Frictional calls such as those previously mentioned are extremely limited in the type and duration of sounds they can produce. Their sound volume is rather limited, and the usually wooden construction "colors" their sound such that they may be functionally limited to a limited species of potential game. In other words, it is usually the case that a "good" frictional turkey call of the aforedescribed type will not function properly for attracting ducks or moose. A reed call, on the other hand, may generally be adapted for use with different animals by varying or changing the replacable reed or diaphragm. However reed replacement or adjustment is inconvenient and difficult with known reed calls.

Another problem with frictional calls is that they usually require the use of both hands. Obviously this can present problems for a hunter who rapidly attracts a turkey with a frictional call, for example, since turkeys will be alarmed into escape flight at the very instant of slightest visible movement of the hunter, and the hunter must make a move with both hands to safely swing his shotgun into action. Usually reed type calls require the use of only one hand, which facilitates rapid firearm deployment.

SUMMARY OF THE INVENTION

The present invention comprises a rigid, generally tubular reed type game call adapted to be employed by a hunter or other outdoorsman to provide a variety of natural and life-like sounds attractive to target animals such as ducks, turkeys or the like.

Preferably the instant game call comprises a rigid, generally tubular barrel shaped body having a lower, cylindrical base which is integral with an associated mouthpiece structure. The mouthpiece terminates in an upper, angled surface penetrated by an air admission orifice in fluid flow communication with the hollow interior of the call. A pair of channels integrally disposed on opposite sides of the upper surface of the mouth piece are adapted to confine and slidably receive a reed which is adapted to be vibrated by inrushing air to produce sound. Preferably an annular, encircling groove is disposed between the lower base portion and the mouthpiece. This groove is adapted to locate a tensioned, encircling necklace adapted to be worn by the user to readily facilitate convenient out-of-the way transportation of the call.

Preferably the guide channels comprise a pair of parallel spaced-apart slots disposed upon opposite sides of the air admission orifice. These slots terminate longitudinally in an integral travel limiting surfaces which prevent improper positioning of the flat vibration producing reed. Preferably the flat upper surface of the mouthpiece forms an angle of approximately twenty-two degrees relative to the horizontal to accommodate the hunter's lips, and the front of the mouthpiece includes a concave user-facing surface adapted to accommodate the lips of the user.

The instant call is adapted to be disposed generally vertically relative to the mouth of the user, rather than horizontally as is the case with known prior art game calls. Moreover, the instant reed structure is adapted to be quickly replaced and adjusted by the user, so that different tones or sounds may be produced as desired. Alternatively, a completely different reed, of a different structure or thickness, for example, may be quickly inserted in the field without completely disassembling the apparatus.

Thus a broad object of the present invention is to provide a high quality reed-type game call which is adapted to produce a wide variety of game sounds and noises.

A more particular object of the present invention is to provide a reed equipped game call of the character described which will appropriately color its sound as desired by the skilled operator.

Yet another object of the present invention is to provide a reed operated turkey call of the character described which may be conveniently worn around the neck of the hunter, and which may be activated in the field with the use of only one hand.

Yet another object of the present invention is to provide a turkey caller of the character described which produces a plurality of turkey calls.

A still further object of the present invention is to provide a reed type game call of the character described to be adapted to emulate the sounds of turkeys, crow, elk, and geese.

Yet another object of the present invention is to provide a vertically operated game call of the reed type.

A related object of the present invention is to provide a game call of the characteristics described which may be readily worn about the neck of the user.

A still further object is to provide a game call which can quickly be modified in the field for producing varying sounds without the necessity of carrying special tools or without disassembling the apparatus, simply by inserting the reeds into the uniquely designed chamber.

A basic object is to provide a "handy," user-friendly reed type game call for hunters which can conveniently be adjusted without removing the reed, and which will comfortably fit the mouth of any user.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 2 is a fragmentary left side elevational view thereof, the right side being a mirror image thereof;

FIG. 3 is a fragmentary rear elevational view thereof, with the cord necklace omitted;

FIG. 4 is a fragmentary front elevational view thereof;

FIG. 5 is a top plan view thereof;

FIG. 6 is a bottom plan view thereof;

FIG. 7 is a reduced scale, fragmentary view thereof, the arrows indicating the preferred path of insertion of the reed into the mouthpiece;

FIG. 8 is a enlarged scale, fragmentary, front plan view of the preferred mouthpiece;

FIG. 9 is a sectional view thereof, taken generally along line 9—9 of FIG. 3;

DETAILED DESCRIPTION

Figure 1:
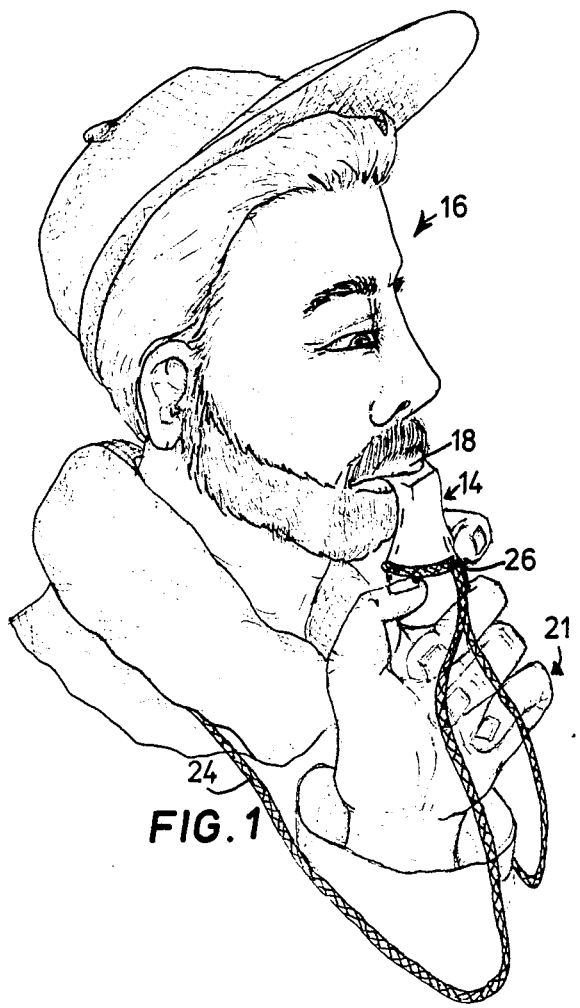
FIG. 1 is a pictorial view illustrating the preferred mode of the present game call in use by a hunter.

With initial reference now directed to FIGS. 1 through 4 of the appended drawings, a game call constructed in accordance with the preferred teachings of the instant invention has been generally designated by the reference numeral 14. Call 14 may be engaged by the mouth of the user 16, wherein it is disposed in a substantially vertical operational position (i.e. as illustrated in FIG. 1). This "vertical" orientation disposes the longitudinal axis of the call in substantially perpendicular relation with the ground. Preferably the call 14 is pressed between the lips 18 of the hunter, and the call may be adequately restrained by a single hand 21. An elongated necklace 24 adapted to be worn about the neck of the user or hunter 16 conveniently transports the call 14.

The preferred call 14 comprises a generally tubular barrel-shaped body having an upper mouthpiece section 30 which is integral with a lower cylindrical base 32. Base 32 is preferably separated from the mouthpiece section 30 by a centrally disposed, annular recessed groove 28, which surrounds the perimeter of the body. At least a portion 26 of the previously described necklace 24 may be tensioned within groove 28 so as to freely control and support the entire call 14.

A reed generally indicated by the reference numeral 33 is adapted to be secured by mouthpiece 30 to reduce sounds as will hereinafter be described. Mouthpiece 30 is generally in the form of a parallelepiped, comprising a user facing surface 35, a pair of integral spaced apart sides 35S,, and a rear surface 35R which faces away from the user 16 in use (FIG. 1). The lowermost portion of the mouthpiece is generally circular, but as height increases the geometry of the mouthpiece becomes substantially "rectangular" (as indicated in FIG. 5). Surface 35, as best seen in FIGS. 2 and 9, is of a concave side profile, and this preferred geometry accommodates the lower lip structure of the user in operation.

Figure 10:
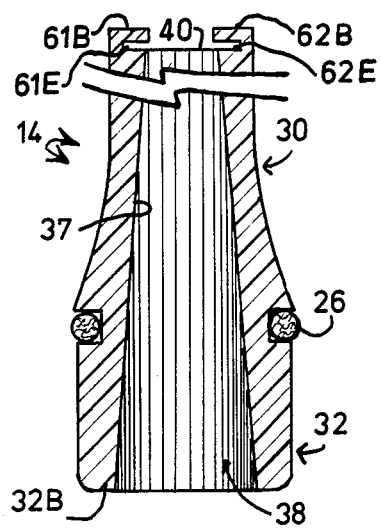
FIG. 10 is a sectional view thereof, taken generally along line 10—10 of FIG. 2.
Figure 11:
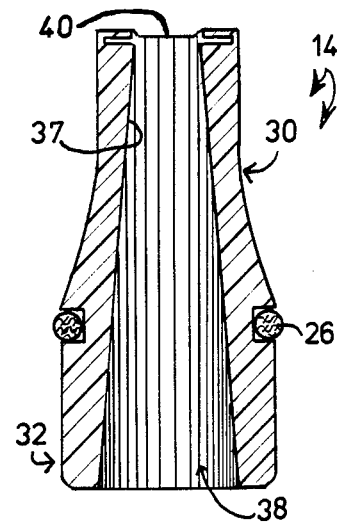
FIG. 11 is a sectional view thereof, taken generally along line 11—11 of FIG. 2; and, FIG. 12 is a sectional view thereof, taken generally along line 12—12 of FIG. 5.

With reference to FIGS. 9 through 11, the hollow interior of the call has been generally designated by the reference numeral 37, and it is generally in the form of a truncated cone. Interior 37 includes a lower output orifice 38 defined in the bottom 32B of base 32 which is in fluid flow communication with an upper air admission orifice 40 defined in the top 44 of the mouthpiece 30. As best indicated in FIG. 2, the top surface 44 of the mouthpiece occupies a plane generally indicated by reference line 50. The longitudinal axis of the call has been generally designated by the reference numeral 52. Plane 50 intersects axis 52 at a point 54 (FIG. 2) which is also intersected by a hypothetical horizontal plane 56 perpendicular to longitudinal axis 52. It is preferable that upper surface 44 form an angle 57 of approximately 65-75 degrees between longitudinal axis 52 and the inclined top face plane 50 as indicated in FIG. 2. In the best mode it is 68 degrees.

A pair of elongated, rigid channels 61 and 62 are integrally defined on opposite sides of top 44 of the mouthpiece 30. As best viewed in FIGS. 2, 3 and 10, the channels 61, 62 include flat, rigid, rectangular portions 61B, 62B respectively (FIG. 7) which cover elongated voids 61E, 62E respectively (FIG. 10). As indicated generally in FIGS. 7, the reed structure 33 is adapted to be fitted within these voids 61E, 62E. It will be noted that as the reed structure 33 is urged into restrained contact between channels 61 and 62, it will variably occlude the air admission orifice 40. It will also be noted that surface or top 44 includes a front shelf surface portion 63A and a rear ledge portion 63B (FIGS. 5, 7). As best viewed in FIG. 9, a pair of travel limiting surfaces 67 defined between upper ledge 63B (FIG. 7) and the interior ends of channels 61 and 62 limit displacement of the reed within the call.

Figure 12:
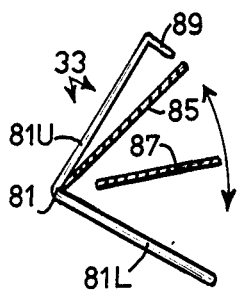

Reed 33 is generally U-shaped, comprising a horseshoe-like frame 81 having a curved outer edge 81B and a pair of integral sides 83, 84 (FIG. 5, 7). The diaphragm is formed of planar latex surfaces 85 and/or 87, and it is preferable that the composite diaphragm be of approximatly 0.05 to 0.5 mils thickness. The plies 85, 87 are best formed of latex rubber and are captured by the frame 81, between sides 83 and 84 and between the upper and lower frame segments generally designated by the reference numerals 81U, 81L respectively (FIG. 12). The diaphragm may thus be either 1-ply or 2-ply. Optionally a tab 89 will be employed to fasten the folded metallic frame members together to form the reed framework.

OPERATION

Game call 14 is adapted to be readily transported by the hunter 16 around his neck by a necklace 24 as previously described. The necklace may be loosely worn about the hunter's neck, and it restrains and transports the call 14 until it is needed for use.

When the hunter has adequately disposed himself in a hunting blind or the like, or has otherwise suitably camouflaged himself for the hunt, the call may be used to emulate a variety of sounds. The reed diaphragm 33 needs to be inserted into the call with tab 89 (FIG. 12) down. The diaphragm formed by reed rubber portions 85 and/or 87 should first be moistened with saliva, and it must be wet to work. Once the mouthpiece is inserted into the mouth 18, it will be noted that the lower lip is smoothly received against the concave user facing surface 35 formed in the upper mouthpiece section 30.

It is of course preferred that a suitable rubber diaphragm 85 or 87 be captured within the reed frame members 83 and 84 between reed plies 81U and 81L (FIG. 12). The desired reed may be slidably inserted between channels 61 and 62 as previously described to variably occlude the upper air admission orifice 40. In operation pitch is determined by the pressure of the top lip upon the reed 33. The more pressure one applies with the lips 18, the more the pitch increases in frequency. The thicker the latex rubber 85 or 87 associated with the reed 33, the lower in pitch the frequency of the sound produced. The more raspy sound is obtained by splitting the reed slightly on each side.

To produce turkey calling or attracting "clucks" the mouth should be placed in position on the call and the user should say "took!". Practice is necessary using words starting with a "T" using a sharp quick motion of the tongue. At all times it should be remembered to force air from the stomach. To produce turkey attracting "yelps" the word "Yuk!" should be repeated while mouthing the reed. The "cackles" may similarly be produced with a change in cadence, since cackles generally comprise an irregular cadence of distinct yelps. A "purr" sound may be made by rolling or vibrating the users tongue over the roof of the mouth.

In addition various possible audible calls may be enhanced or modified by wrapping the hand 21 about the call. A crow sound may be made by saying the word "caw". Elk attracting sounds may be generated with a guttural throat-emanated growl sound while air is being forced from the lungs over the reed.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable, mouth-operated, reed-equipped game call adapted to be operatively disposed in a generally vertical position when in use, said game call comprising:
    a rigid, generally tubular, barrel-shaped body having a hollow interior, said body comprising an integral, tubular mouthpiece engageable by the mouth of a user, said mouthpiece having an upper mouthpiece surface adapted to be contacted by the upper lip of the user and a generally concave surface portion adapted to project toward and be contacted by the lower lip of the user;
    a lower base associated with said body and integrally extending between a circular bottom and said mouthpiece;
    a longitudinal axis extending generally coaxially within said hollow interior between said circular bottom and said flat, angled upper surface, said axis intersecting said upper mouthpiece surface, whereby the angle between said upper mouthpiece surface and said axis is approximately sixty-five to seventy-five degrees;
    said upper mouthpiece surface comprising an air admission orifice in fluid flow communication with the hollow interior of said call;
    reed means releasably externally associated with said upper surface for producing sounds of varying pitches in cooperation with said body, said reed comprising a flat, genrally horseshoe shaped frame having a pair of sides and a flexible diaphragm means for producing game sounds in response to the introduction of air into said air admission orifice, said diaphragm means being captured between said sides for positioning above said air admission orifice;

channel means defined in said upper mouthpiece surface for slidably receiving and externally mounting said reed means upon said mouthpiece, said channel means comprising a pair of spaced-apart, parallel guide channels disposed upon opposite sides of said air admission orifice for receiving said reed means frame sides, each channel comprising integral travel limiting surfaces for preventing overtravel of said reed; and, a recessed circumferential groove defined between said base and said mouthpiece for capturing at least a portion of a call supportive necklace.

2. The game call as defined in claim 1 wherein said angle is approximately sixty-eight degrees.

3. A portable mouth-operated bird and animal call for hunters, and outdoorsmen, said call comprising:

a rigid, generally tubular, barrel-shaped body comprising a lower cylindrical base and an integral tubular mouthpiece adapted to be contacted by the mouth of the user, a hollow interior of generally conical configuration, and a longitudinal axis, said axis adapted to be disposed in substantially perpendicular relation with respect to the ground when said call is used;

said mouthpiece having a box-like shape and extending integrally between said lower base and an upper mouthpiece surface having an air admission orifice in fluid flow communication with said call interior;

a concave lip accommodation surface adapted to comfortably contact the lower lip of the user; whereby the angle between said upper mouthpiece surface and said axis is approximately sixty-five to seventy-five degrees diaphragm-equipped reed means adjacent said air admission orifice for producing game attactive sounds, said reed means adapted to selectively receive a one-ply or two-ply flexible diaphragm and responsive to direct lip pressure for varying the sound produced thereby;

channel means defined in said upper mouthpiece surface for receiving and securing said reed means, said channel means comprising a pair of spaced-apart guide channels; and, said reed means releasably associated with said upper mouthpiece surface and slidably captured and retained between said spaced-apart guide channels, and said reed means comprising a flat, generally horseshoe shaped frame having a pair of sides adapted to ride in said channels, said diaphragm being centrally captured between said sides for spaced apart positioning directly above and parallel to said air admission orifice.

4. The game call as defined in claim 3 wherein said angle is approximately sixty-eight degrees.

* * * * *